Sept. 12, 1933.                L. G. WHITE                 1,926,641
                              POULTRY FEEDER
                         Filed Dec. 13, 1932         3 Sheets-Sheet 1
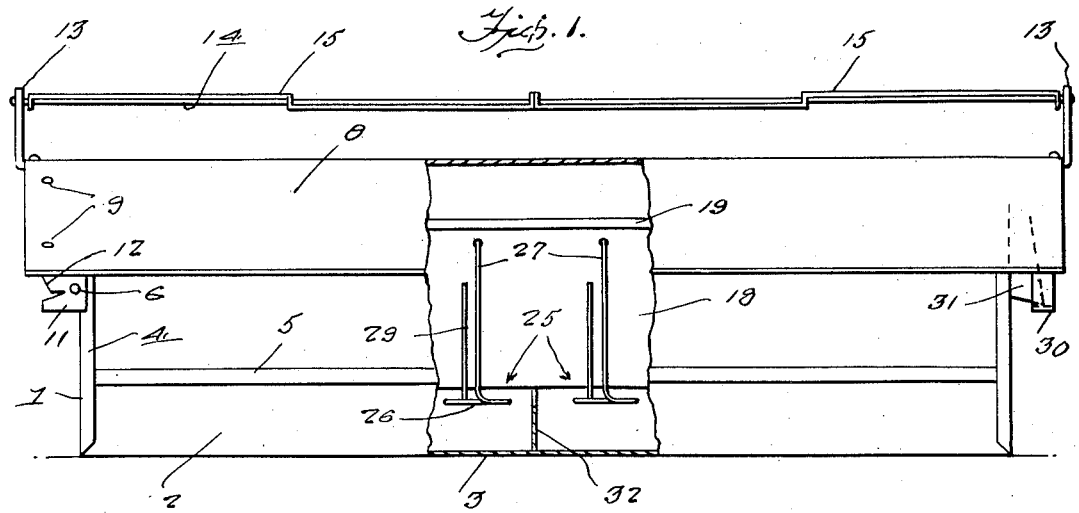
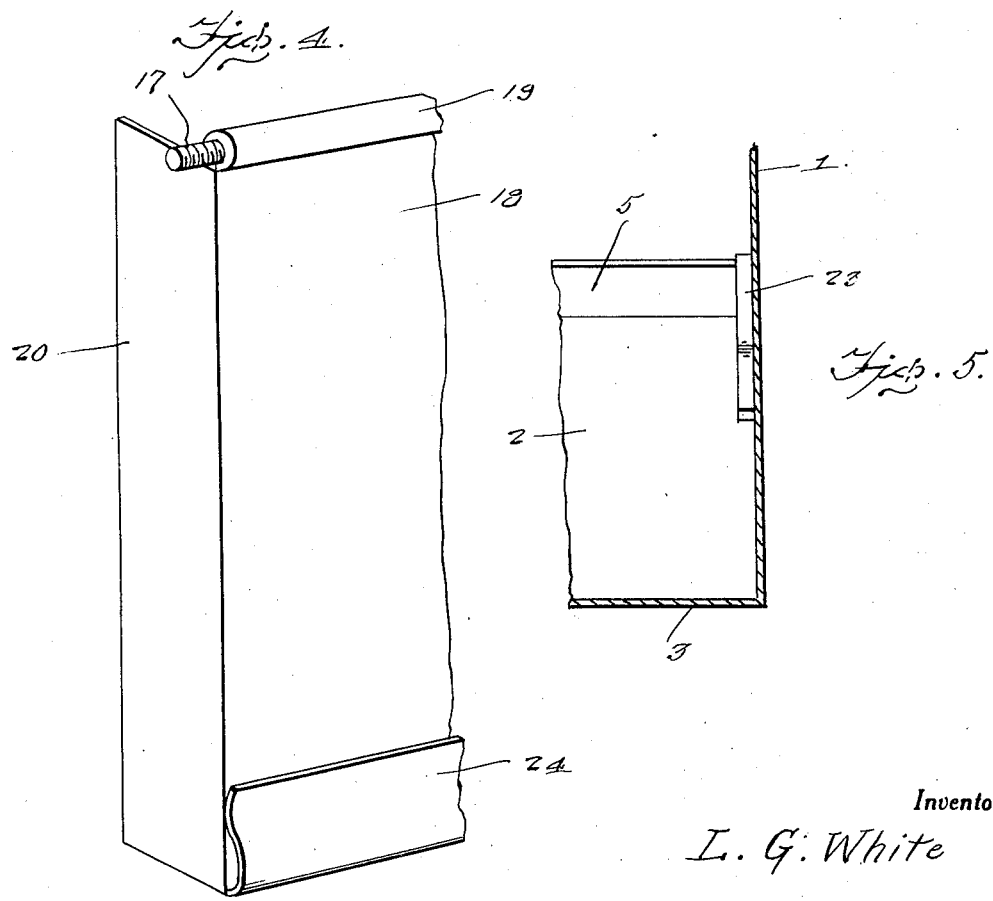
Inventor
L. G. White
By Clarence A. O'Brien
Attorney Sept. 12, 1933.   L. G. WHITE   1,926,641
POULTRY FEEDER
Filed Dec. 13, 1932   3 Sheets-Sheet 2

Inventor
L. G. White
By *Clarence A. O'Brien*
Attorney

Sept. 12, 1933.  L. G. WHITE  1,926,641
POULTRY FEEDER
Filed Dec. 13, 1932    3 Sheets-Sheet 3

Inventor
L. G. White
By Clarence A. O'Brien
Attorney

Patented Sept. 12, 1933

1,926,641

UNITED STATES PATENT OFFICE 1,926,641

POULTRY FEEDER

Lester G. White, Athens Township, Bradford County, Pa.

Application December 13, 1932
Serial No. 647,039

9 Claims. (Cl. 119—53)

The present invention relates to new and useful improvements in poultry feeders, and has for one of its important objects to provide, in a manner as hereinafter set forth, a device of this character embodying a novel construction, combination and arrangement of parts through the medium of which same may be conveniently adjusted to accommodate the poultry regardless of size from small chicks to full grown birds.

Another object of the invention is to provide novel means operable by the poultry for agitating the feed in a manner to assure the proper feeding thereof regardless of the mixture.

Other objects of the invention are to provide a poultry feeder which will be simple in construction, strong, durable, highly efficient and reliable in use, compact, light in weight, sanitary and which may be manufactured at low cost.

All of the foregoing and still further objects and advantages of the invention will become apparent from a study of the following specification, taken in connection with the accompanying drawings, wherein like characters of reference designate corresponding parts throughout the several views, and wherein:—

Figure 1 is a view partly in side elevation, and partly in vertical section, showing a poultry feeder constructed in accordance with the present invention.

Fig. 4 is a perspective view of one end portion of one of the adjustable hopper walls.

Fig. 5 is a detail view in vertical section thru the lower portion of one end portion of the feeder, showing one of the hopper wall guides.

Figure 2:
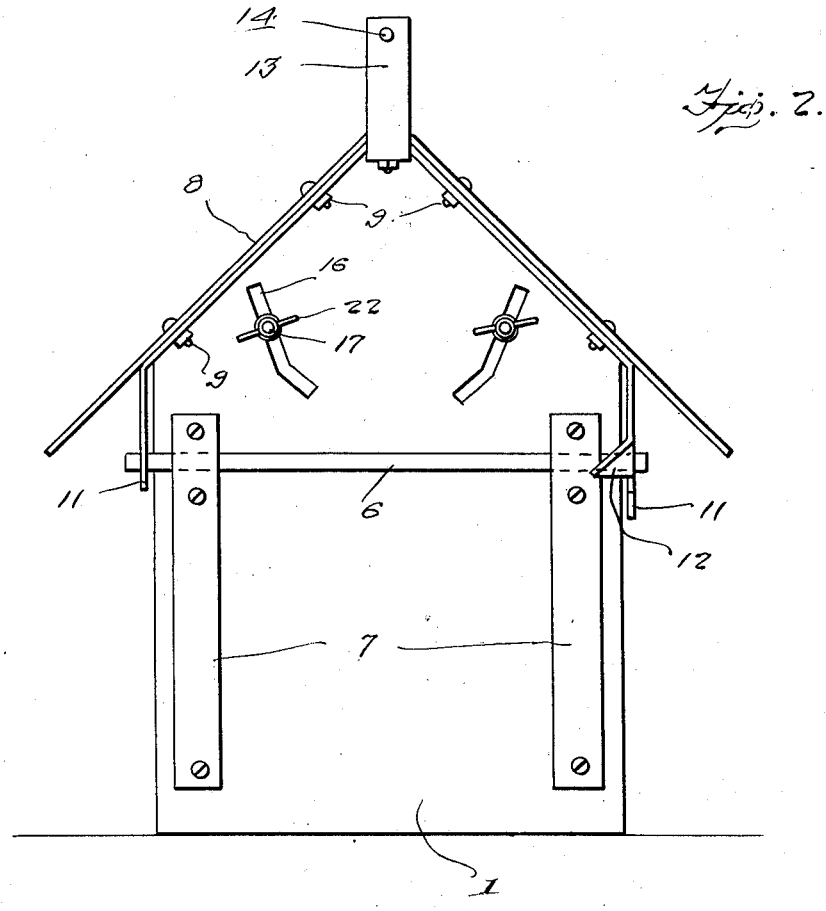
Fig. 2 is a view in end elevation thereof.

Referring now to the drawings in detail, it will be seen that the embodiment of the invention which has been illustrated is of metal construction and comprises end walls 1 and comparatively short side walls 2 which rise from a bottom 3, said end walls including inturned marginal flanges 4. The upper portions of the side walls 2 are turned inwardly to provide inclined flanges 5.

The reference numeral 6 designates a shaft which is mounted horizontally on the outer side of one of the end walls 1 through the medium of vertical bars 7. The ends of the shaft 6 project beyond the sides of the feeder, as best seen in Fig. 2 of the drawings. The reference numeral 8 designates an anticlinal roof which projects beyond the end walls 1 of the feeder. Secured beneath one of the projecting end portions of the roof 8, as at 9, is a hinge bracket 10 which includes downturned free end portions 11 which are journaled on the projecting end portions of the shaft 6, thus mounting the roof for swinging movement in a vertical plane on one of the end walls 1 of the feeder. A stop 12 is struck inwardly from one of the end portions 11 of the hinged bracket 10 for engagement with the adjacent end wall 1 for limiting the swinging movement of the roof 8 in one direction and for supporting said roof in open position.

Figure 6:
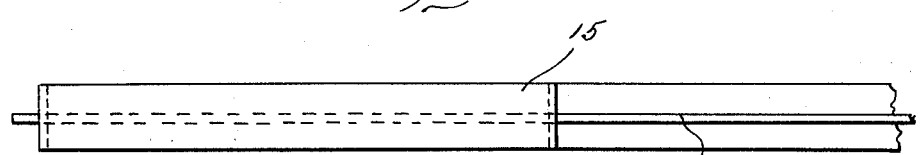
Fig. 6 is a detail view in plan, showing a portion of the rotary guard.
Figure 7:
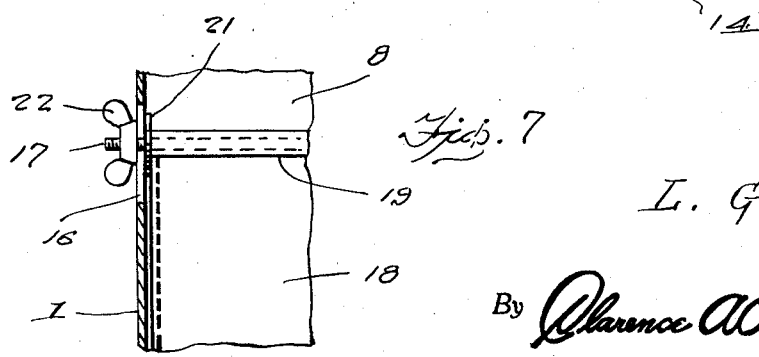
Fig. 7 is a detail view in vertical section, showing the means for adjustably mounting the hopper walls on the ends of the feeder.

Rising from the apex portion of the roof 8, at the ends of said roof, are brackets 13 between which a taut wire or rod 14 extends. Rotary guards 15 are journalled on the wire or rod 14 to prevent the poultry from roosting on top of the feeder. The guards 15 are of metal, each guard comprising relatively offset longitudinal portions which are connected by a right angular intermediate portion through which the wire or rod 14 passes, said longitudinal portions terminating in oppositely extending end portions through which the wire or rod 14 also passes, as best seen in Figs. 1 and 6 of the drawings.

The upper portions of the end walls 1 are provided with inwardly inclined, angular slots 16 through which the threaded end portions of rods 17 project. Mounted on the rods 17 and depending therefrom are adjustable hopper walls 18 having their upper portions rolled to provide tubes or eyes 19 through which the rods 17 extend. At their ends the hopper walls 18 terminate in inturned flanges 20 which are closely adjacent the end walls 1 for preventing the escape of feed at these points.

Washers 21 are mounted on the rods 17 between the ends of the tubes or eyes 19 and the end walls 1. Then, wing nuts 22 are threaded on the rods 17 and are engageable with the end walls 1, as will be apparent, for frictionally securing the hopper walls 18 in adjusted position.

Mounted on the inner sides of the end walls 1 and on the lower portions of said end walls, are inwardly inclined, angular guides 23 with which the hopper walls 18 are engaged. Substantially reversed flanges 24 are provided on the lower edges of the hopper walls 18 for engagement with the guides 23. The guides 23 prevent outward swinging movement of the hopper walls 18 under the weight of the feed and, in addition, serve to maintain said hopper walls in a substantially vertical position when same are adjusted.

It will thus be seen, that, by loosening the wing nuts 22, the rods 17 may be adjusted in the inclined, angular slots 16, thus moving the hopper walls 18 toward or away from the free edges of the inturned guard flanges 5 for increasing or decreasing the width of the feed openings. When the rods 17 are moved downwardly in the slots 16, thus lowering the hopper walls 18, the guides 23 will cause the lower ends of the hopper walls to move inwardly.

Figure 3:
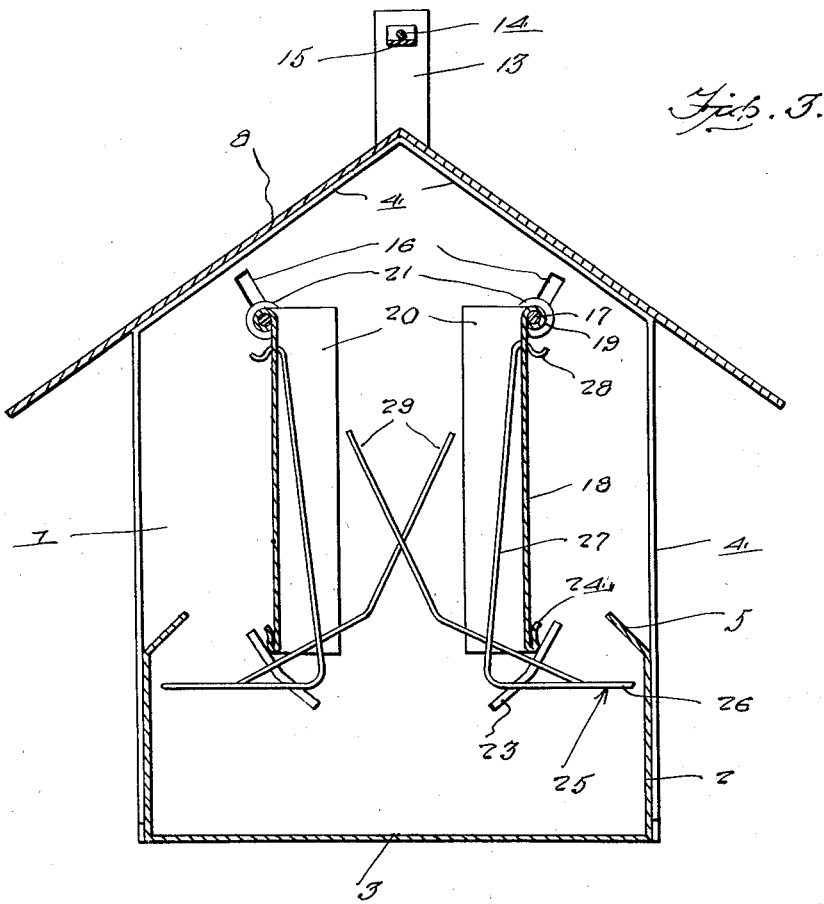
Fig. 3 is a view in vertical transverse section through the feeder.
Figure 8:
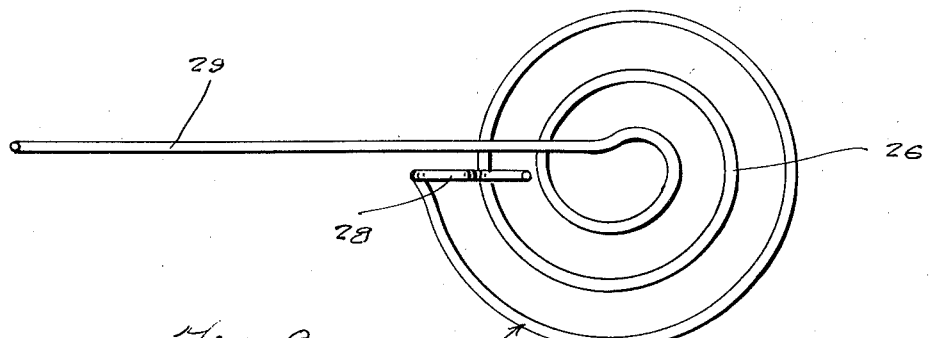
Fig. 8 is a detail view in top plan of one of the agitators.

Mounted on the hopper walls 18 are feed agitators which are designated generally by the reference numeral 25. Each agitator 25 comprises a flat coil spring 26 from the outer end of which an arm 27 rises, said arm terminating, at its free end, in a hook 28 which is engaged in an opening provided therefor in the hopper walls 18. As best seen in Fig. 3 of the drawings, the arms 27 are suspended by the hooks 28 on the inner sides of the hopper walls 18 and the springs 26 project outwardly beneath said hopper walls and across the feed openings above the feed or substantially on the surface of said feed. Extending inwardly and upwardly from the inner ends of the springs 26 are integral, angular fingers 29 which project between the hopper walls 18. In use, the poultry, when feeding from the device, will strike the coil springs 26 and move or actuate same, thereby shaking or vibrating the fingers 29 for loosening the feed between the hopper walls 18. The arms 27 may also assist in loosening the feed. Still further, the flat coil springs 26 may function to prevent the feed from being thrown out of the device.

Mounted on the projecting end portions of the roof 8 which is remote from the hinged bracket 10 is a latch member 30 which is operatively engageable with a projection 31 which is mounted on the adjacent end wall 1 for releasably securing said roof in closed or lowered position. It will thus be seen that the feeder may be conveniently filled by simply disengaging the latch member 30 from the projection 31 and swinging the roof 8 upwardly on the shaft 6 until movement of said roof in this direction is arrested by the engagement of the stop member 12 with the adjacent end wall 1. As previously stated, stop 12 will support the roof in this raised or opened position. After the feeder has been filled, the roof 8 is, of course, returned to closed or lowered position. The reference numeral 32 designates a partition extending between the side walls 2. If desired, more than one partition 32 may be provided.

It is believed that the many advantages of a poultry feeder constructed in accordance with the present invention will be readily understood, and although the preferred embodiment of the invention is as illustrated and described, it is to be understood that changes in the details of construction and in the combination and arrangement of the parts may be resorted to which will fall within the scope of the invention as claimed.

Having thus described my invention, what I claim as new is:—

1. A feeder comprising a bottom, side and end walls rising from the bottom, the end walls extending above the side walls, a roof mounted on the end walls, said end walls having pairs of inclined slots therein, rods extending between the end walls and adjustably engaged in the slots, and hopper walls mounted on the rods and depending therefrom.

2. A poultry feeder comprising a bottom, side and end walls rising from the bottom, the end walls extending above the side walls, a roof mounted on the end walls, said end walls having pairs of inclined slots therein, rods extending between the end walls and adjustably engaged in the slots, hopper walls mounted on the rods and depending therefrom, and inclined guides mounted on the end walls and operatively engaged with the lower portions of the hopper walls.

3. A feeder comprising a bottom, side and end walls rising from the bottom, a roof mounted on the end walls, said end walls having pairs of inclined slots therein, rods extending between the end walls and adjustably engaged in the slots, hopper walls mounted on the rods and depending therefrom, inturned flanges on the ends of the hopper walls extending closely adjacent the end walls, and inclined guides mounted on the end walls and engaged with the lower portions of the hopper walls.

4. A poultry feeder comprising, in combination, a bottom, end walls rising from the bottom, a roof mounted on the end walls, hopper walls extending between the end walls and adjustably mounted on said end walls, poultry actuated feed agitators mounted on the hopper walls, each agitator comprising a substantially flat coil spring, an arm rising from the outer end of the coil spring, a hook on the free end of the arm engaged with the hopper wall for mounting the coil spring thereon, and a finger extending from the inner end of the coil spring between the hopper walls.

5. An agitator for feeders comprising a substantially flat coil spring, an arm projecting from the outer end of the coil spring, a hook on the free end of the arm, and a finger extending from the inner end of the coil spring.

6. A poultry feeder comprising a bottom, side and end walls rising from the bottom, the end walls extending above the side walls, a roof mounted on the end walls, said end walls having pairs of inclined slots therein, rods extending between the end walls and adjustably engaged in the slots, inwardly directed, inclined flanges on the upper edges of the side walls, hopper walls mounted on the rods and depending therefrom adjacent the flanges, inturned flanges on the ends of the hopper walls extending closely adjacent the end walls, inclined guides mounted on the end walls and engaged with the lower portions of the hopper walls for adjustably retaining said hopper walls against outward swinging movement, and feed agitators mounted on the hopper walls, said hopper walls having openings therein, the agitators comprising substantially flat coil springs extending horizontally beneath the hopper walls, arms rising from the outer ends of the coil springs, hooks on the free ends of the arms engaged in the openings in the hopper walls, and fingers extending from the inner ends of the coil springs between the hopper walls.

7. A poultry feeder comprising a bottom, end and side walls rising from the bottom, a roof mounted on the end walls, hopper walls extending between the end walls, said hopper walls being spaced inwardly from the side walls, and agitators mounted on the hopper walls, said agitators comprising arms mounted on the hopper walls between said hopper walls, coil springs projecting outwardly from the lower ends of the arms beneath the hopper walls, and agitator fingers extending from the coil springs between the hopper walls.

8. A poultry feeder comprising a bottom, end walls rising from the bottom, a shaft journaled horizontally on one of the end walls and projecting beyond the vertical edges thereof, a roof, a hinge bracket secured to one end portion of the roof and including downturned free end portions journaled on the shaft for mounting the roof on said shaft for swinging movement in a vertical plane, and side walls rising from the bottom.

9. A feeder guard comprising standards rising from the feeder, a rod extending between the standards, and a member rotatably mounted on the rod, said member including relatively offset longitudinal portions and a connecting portion and further including oppositely extending right angular end portions, the rod extending through said end portions and the connecting portion.

LESTER G. WHITE.